United States Patent [19]

Ruehle

[11] 4,064,479
[45] Dec. 20, 1977

[54] VERTICALLY DIRECTIVE ARRAYS FOR MARINE SEISMIC EXPLORATION

[75] Inventor: William H. Ruehle, Duncanville, Tex.

[73] Assignee: Mobil Oil Corporation, New York, N.Y.

[21] Appl. No.: 669,077

[22] Filed: Mar. 22, 1976

[51] Int. Cl.² .................... G01V 1/38; G01V 1/13; G01V 1/16
[52] U.S. Cl. .................... 340/7 R; 181/110; 181/111; 181/112; 340/9; 340/15.5 CP
[58] Field of Search .................... 340/3 T, 6 S, 7 R, 9, 340/15.5 CP, 15.5 AF, 15.5 CF; 181/110, 111, 112, 118, 139, 140; 73/67.5 R

[56] References Cited

U.S. PATENT DOCUMENTS

| | | | |
|---|---|---|---|
| 3,286,228 | 11/1966 | Anstay | 340/15.5 CP |
| 3,317,890 | 5/1967 | Henslry | 340/7 R |
| 3,460,064 | 8/1969 | Giles et al. | 340/15.5 CP |
| 3,687,218 | 9/1972 | Ritter | 181/111 |
| 3,852,708 | 12/1974 | Doolittle et al. | 340/7 R |

FOREIGN PATENT DOCUMENTS 699,875  12/1964  Canada .................... 340/7 R

OTHER PUBLICATIONS

Tucker, "Same Aspects of the Design of Strip Arrays," 1956, pp. 403–411, Acustica, vol. 6.
Tucker, "The Signal/Noise Performance of Electro-Acoustic Strip Arrays", 1958, pp. 53–62, Acustic, vol. 8.
Heaps, "General Theory for the Synthesis of Hydrophone Arrays," 3/60, pp. 356–363, Jour. Acoust. Soc. of Amer., vol. 32, No. 3.
Pritchard, "Maximum Directivity Index in a Linear Point Array," 11/54, pp. 1034–1039, Jour. Acoust. Soc. of Amer., vol. 26, No. 6.

*Primary Examiner*—Nelson Moskowitz
*Attorney, Agent, or Firm*—C. A. Huggett; George W. Hager, Jr.

[57] ABSTRACT

A system for marine seismic exploration has arrays of sources and receivers which discriminate against horizontal traveling source-generated noise. Directive arrays of sources or receivers have a length which is longer than the wavelength of the lowest frequency of the seismic pulse. The spacing between the elements in the array is less than the wavelength of the highest characteristic frequency in the seismic pulse.

5 Claims, 6 Drawing Figures

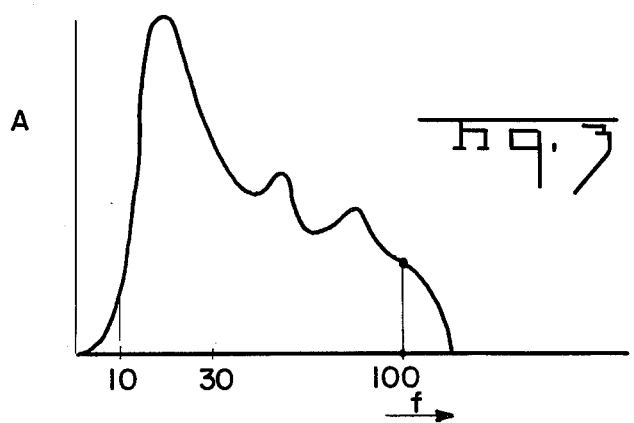
Fig. 3
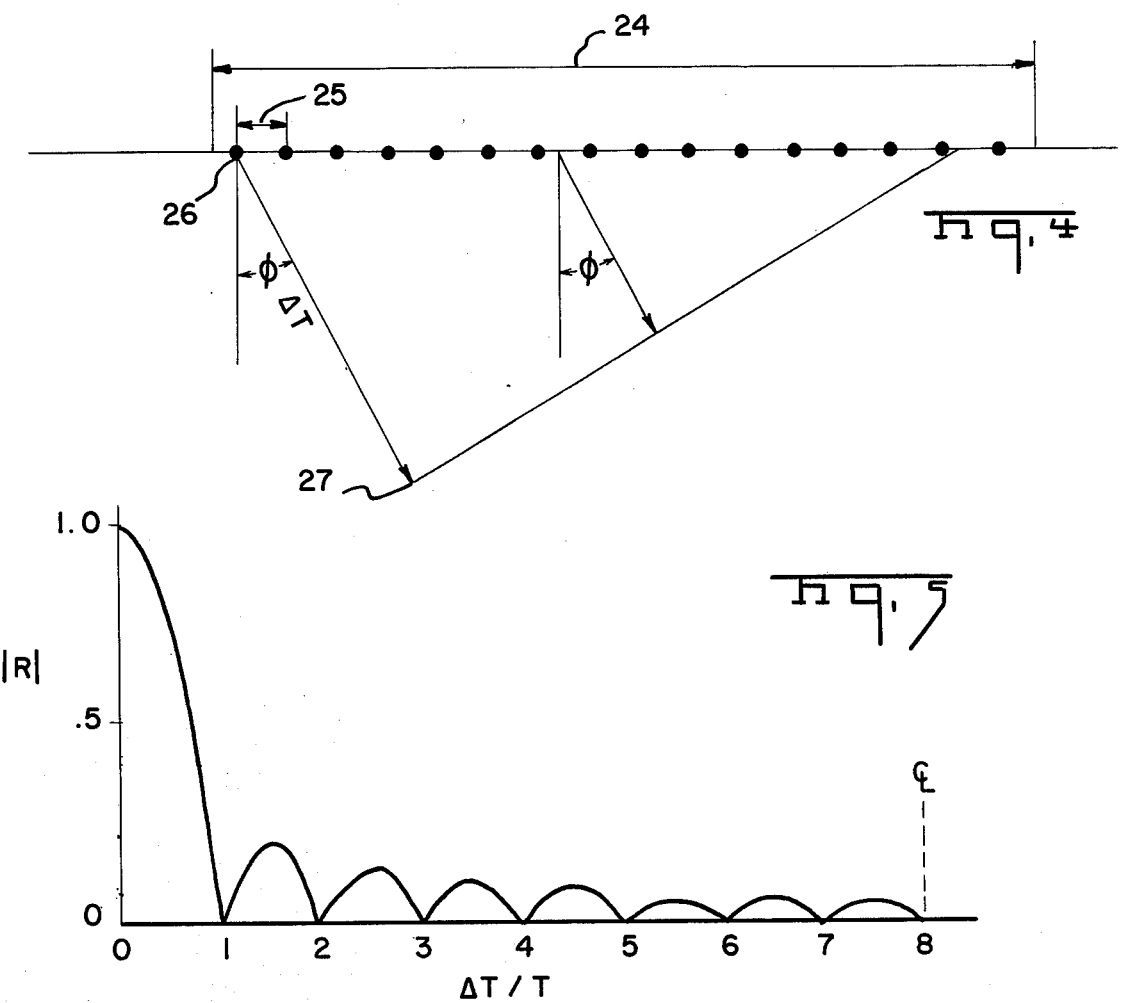
Fig. 4
Fig. 5

VERTICALLY DIRECTIVE ARRAYS FOR MARINE SEISMIC EXPLORATION

BACKGROUND OF THE INVENTION

This invention relates to methods of and apparatus for marine seismic exploration, and more particularly to arrays of sources and receivers which have vertical directivity.

In marine seismic exploration the seismic energy can be generated by a linear array of sources which are towed behind the boat. The towing cables provide a fixed spacing between the sources. Typically, each source may be an "air gun" which releases pulses of compressed air into the water. A typical air gun is shown in U.S. Pat. No. 3,506,085 to George B. Loper. Such guns emit seismic pulses having a characteristic frequency including the lowest frequency, the highest frequency and the predominant frequency of the seismic energy in each pulse.

The boat also tows a streamer of hydrophones which detect the seismic energy reflected from subsurface formations. Systems which have a long offset between the sources and the hydrophones are subject to high amplitude nearly horizontal traveling source-generated noise.

It can be shown that there is a critical distance from the source which is determined by the acoustic velocity in the water and the acoustic velocity in the bottom. Beyond the critical distance, energy is totally reflected and propagates horizontally. It is desirable to use sources and receivers which discriminate against such horizontal propagation.

In the prior art the array length and the spacing between the elements of the array have been determined by the predominant frequency in the seismic pulse. Such techniques provide directivity for energy at the predominant frequency but they do not give good directivity over the broad band of the seismic pulse. For example, in U.S. Pat. No. 3,479,638, the spacing between the sources is an integer of one-half the wavelength of the desired frequency. In U.S. Pat. No. 3,613,823, the length of the array is greater than one wavelength of the predominant frequency. Such approaches will not give directivity over the broad band of the seismic pulse.

SUMMARY OF THE INVENTION

In accordance with this invention, vertically directive arrays of sources and detectors are used to discriminate horizontally propagated source-generated noise in marine seismic exploration.

Vertical directivity over the broad band of the seismic pulse is obtained by horizontal arrays of sources and receivers which have a length longer than the wavelength of the lowest frequency of the seismic pulse. The spacing between the elements of the array is less than the wavelength of the highest frequency in the seismic pulse.

The directivity of the array of sources can be changed by changing the time delay between the firing of the sources in the array.

The foregoing and other objects, features and advantages of the invention will be better understood from the following more detailed description and appended claims.

DESCRIPTION OF THE DRAWINGS

FIG. 3 shows the characteristic frequency of a typical marine seismic source;

FIG. 4 depicts the directivity of a linear array of seismic sources;

FIG. 5 depicts the response of a 16 element linear array; and

DESCRIPTION OF THE PREFERRED EMBODIMENT

Figure 1:
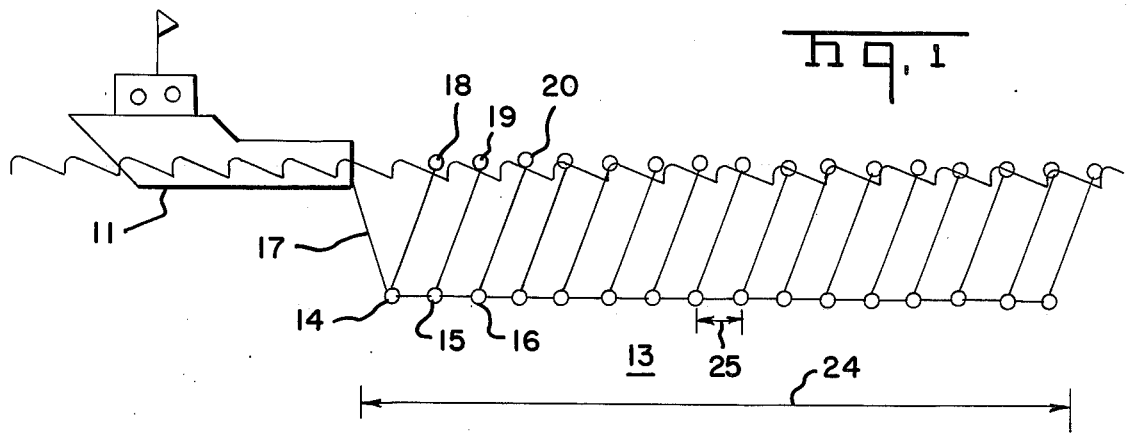
FIGS. 1 and 2 show the marine seismic exploration system.
Figure 2:
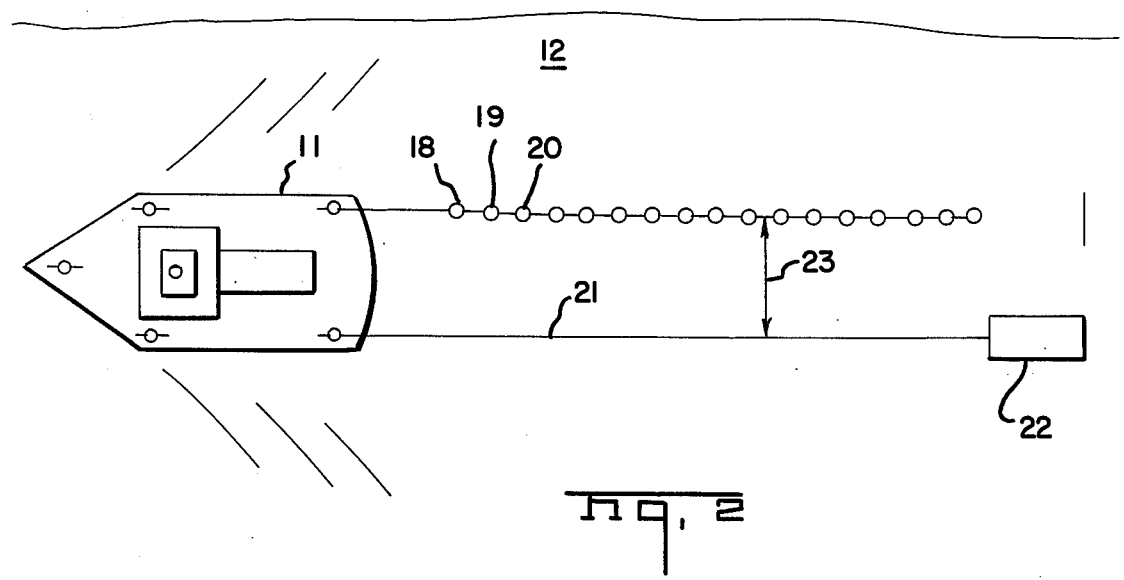

FIGS. 1 and 2 show a marine seismic exploration system. A vessel 11 traverses a seismic exploration path in surveying the subsurface formation 12 below the water layer 13. A linear horizontal array of seismic sources 14, 15, 16 and others is towed behind the boat by the cable 17. Surface floats 18, 19, 20 and others help to maintain the equal spacing between the sources.

A hydrophone streamer 21 is also towed behind the boat. The first hydrophone in the array can be positioned anywhere from the boat out. Ideally, the first hydrophone is positioned directly opposite the center of the array of sources. A surface support buoy 22 helps to maintain the proper relationship between the hydrophone streamer and the source array. These are offset one from the other by a distance denoted by the arrow 23. This offset distance is such that the hydrophones in the streamer 21 are subject to horizontally propagated noise from the source array.

The sources in this array may be any suitable conventional type of air guns such as the type disclosed in U.S. Pat. No. 3,506,085 to George B. Loper. In such a gun, an electrical signal operates an electromagnetic valve to allow high pressure air to be suddenly released from a chamber within the gun, thereby producing a seismic pulse in the water. Typically, air guns of this type have a capacity in the range of 80–200 cubic inches. The characteristic frequency of the seismic pulse produced by a typical air gun is shown in FIG. 3, which depicts the amplitude of the acoustic seismic pulse as a function of frequency. As depicted in FIG. 3, the lowest frequency of the seismic pulse is 10 Hz., the highest frequency is 100 Hz., and the predominant frequency is 30 Hz. It is desirable to make both the source array and the hydrophone array vertically directive to discriminate against horizontally propagating noise, and to maximize the response to the hydrophones to the broad band frequency content of the seismic pulse such as that depicted in FIG. 3. Prior art attempts to maximize the response of hydrophones to the seismic pulse have configured the source array to obtain maximum reponse at the predominant frequency, for example, at 30 Hz. of the seismic pulse depicted in FIG. 3.

In accordance with this invention, the length 24 of the array, depicted in FIG. 1, is longer than the wavelength of the lowest frequency of the seismic pulse. For example, when using air guns having a characteristic frequency depicted in FIG. 3, and assuming a water velocity of 5,000 feet per second, the array is substantially longer than (5,000/10) = 500 feet.

Further, in accordance with this invention, the spacing between the elements of the array, denoted by the arrow marked 25 in FIG. 1, is less than the wavelength of the highest characteristic frequency in the pulse. Again, referring to the example of the air gun having a characteristic frequency depicted in FIG. 3, the spacing is less than (5,000/100) = 50 feet.

As one example of the practice of this invention, the total length of the array is 800 feet which is substantially longer than 500 feet. The array is made up of 16 guns spaced at 50 foot intervals.

The hydrophones in the streamer 21 may have the same spacing and array length. The reasons why such arrays provide vertical directivity and good response over the broad band of the seismic pulse will be understood from the following.

Directive arrays can be described with reference to FIG. 4. The directivity of the array is specified by ΔT which is the time required for a seismic pulse to travel from the source 26 to the point 27. Stated another way, it is the time required for a seismic pulse to travel from the source at one end of the array to the plane wave front of the pulse from other sources. ΔT is given by:

$$\Delta T = n(\tau - \Delta X \frac{\cos\Phi}{V_w}) \quad (1)$$

In the foregoing, $n$ is the number of elements of the array, $\Delta X$ is the spacing between the elements, $\Phi$ is the angle between the vertical and the path of the pulse, $V_w$ is the velocity of the seismic pulse in water and $\tau$ is the time delay between the time of firing each source. The frequency of the seismic pulse is $1/T$. For the horizontal array of sources under consideration, $\tau = 0$ to obtain maximum vertical directivity.

The steady state response of the geophone streamer to such a linear array of sources is given by:

$$R(\frac{\Delta T}{T}) = \frac{\sin \pi \Delta T/T}{\pi \Delta T/T} \quad (2)$$

This response is shown in FIG. 5.

Figure 6:
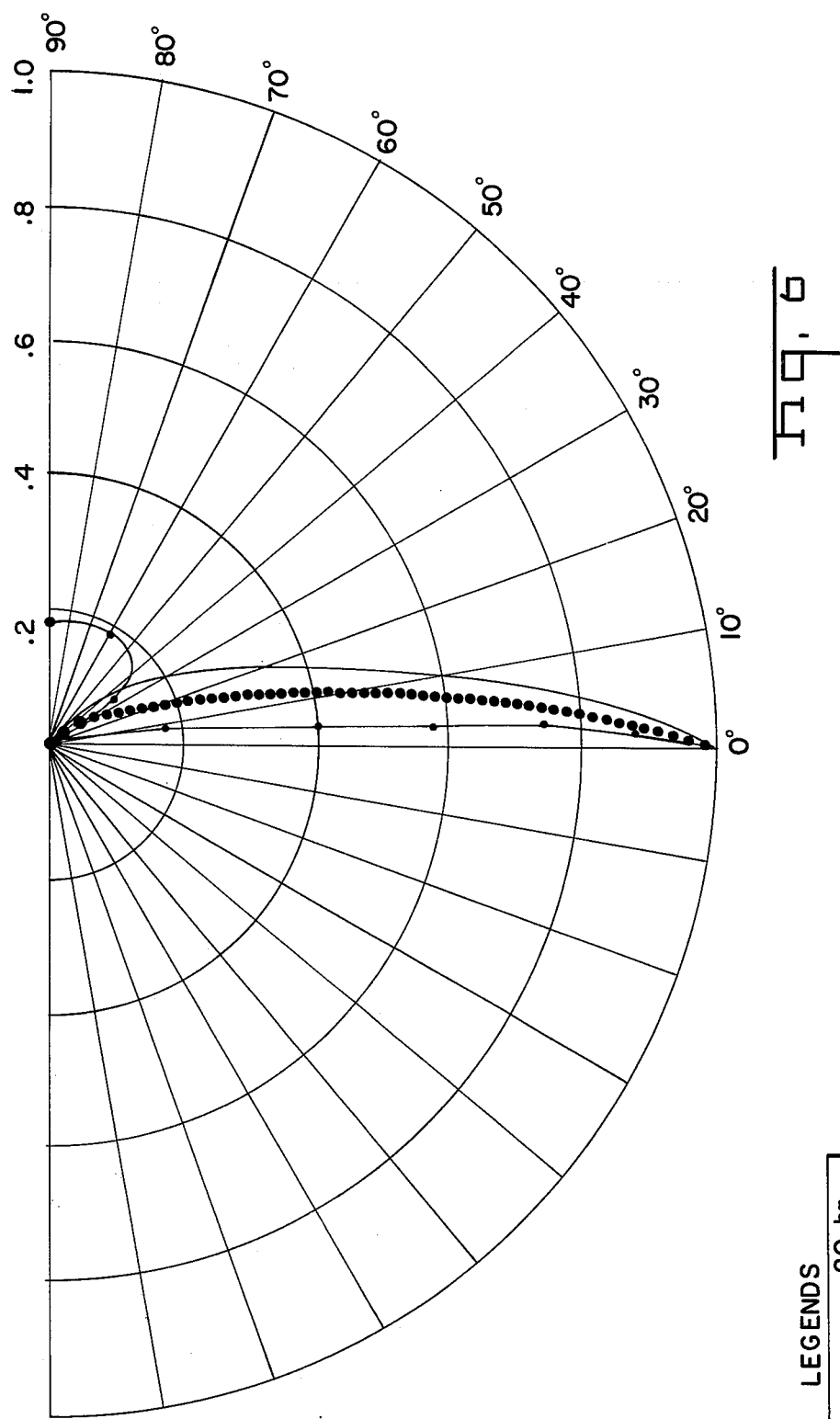
FIG. 6 is a polar response plot of a linear array.

In practice, the response of the system is determined by picking $\Phi$ and $V_w$ and computing $\Delta T$ and from equation (1). For the example under consideration, $\Delta T =$ (800) ($-\cos\Phi/5000$). With this $\Delta T$, various T's or frequencies are assigned to form the ratio $\Delta T/T$. From the values of $\Delta T/T$, the response is determined from (2) above, or from the response curve in FIG. 5. A range of such values are tabulated and can be plotted as polar response curves. FIG. 6 shows such curves. FIG. 6 depicts the response for a horizontal linear array having 16 elements spaced at 50 feet with no delay between the sources. The polar response plot depicts the relative strength of seismic energy at a given frequency propagating at different angles when compared to that propagating from a point source. A point source has a polar response plot characterized by the circle of amplitude 1.0.

Note that for very large T, the range of values $\Delta T/T$ will be between 0 and 1. As T decreases, $\Delta T/T$ will increase beyond 1 and side lobes appear on the polar response plot (dotted curve). Curves are symmetrical about $\Phi = 0°$ for case of $\tau = 0$.

The horizontal arrays of this invention are particularly suitably for use where the sources are fired in separate groups to produce a seismic pulse having a time domain characteristic representative of the inverse of the distortion effect caused by reverberation in the water layer. Such a technique is described in my copending application Ser. No. 554,047, filed Feb. 28, 1975.

While a particular embodiment of the invention has been shown and described, various modifications are within the true spirit and scope of the invention. The appended claims are intended to cover all such modifications.

What is claimed is:

1. In a system for marine seismic exploration comprising:
    a marine vessel,
    a plurality of seismic energy sources each producing seismic pulses having a broadband frequency content including the lowest frequency, the highest frequency and the predominant frequency of the seismic energy in each pulse,
    a plurality of hydrophones for detecting reflected seismic pulses, and
    means for towing said sources and said hydrophones in horizontal linear arrays behind said vessel with fixed spacing between said sources, fixed spacing between said hydrophones, and an offset distance between the array of sources and the array of hydrophones,
    the improvement wherein the length of at least one of said arrays is longer than the wavelength of the lowest frequency within the broadband frequency content of said seismic pulses, and wherein the spacing between elements of said array is less than the wavelength of the highest frequency within the broadband frequency content of said seismic pulses.

2. The system for marine seismic exploration of claim 1 wherein the length of the array of sources is longer than the wavelength of the lowest frequency within the broadband frequency content of said seismic pulses and wherein the spacing between the sources is less than the wavelength of the highest frequency within the broadband frequency content of said seismic pulses.

3. The system for marine seismic exploration recited in claim 1 wherein the length of the array of hydrophones is longer than the wavelength of the lower frequency within the broadband frequency content of said seismic pulses and wherein the spacing between hydrophones is less than the wavelength of the highest frequency within the broadband frequency content of said seismic pulses.

4. In a system for marine seismic exploration comprising:
    a marine vessel,
    a plurality of seismic energy sources each producing seismic pulses having a broadband frequency content including the lowest frequency, the highest frequency and the predominant frequency of the seismic energy in each pulse, and
    means for towing said sources in a linear array behind said vessel with fixed spacing between said sources,
    the improvement wherein the length of said array of sources is longer than the wavelength of the lowest frequency within the broadband frequency content of said seismic pulses, and wherein the spacing between said sources is less than the wavelength of the highest frequency within the broadband frequency content of said seismic pulses.

5. In a system for marine seismic exploration comprising:
    a marine vessel,
    a seismic energy source producing seismic pulses having a broadband frequency content including the lowest frequency, the highest and the predominant frequency of the seismic energy in each pulse,
a plurality of seismic detectors, and
means for towing said detectors in a horizontal linear array behind said vessel with fixed spacing between said detectors,
the improvement wherein the length of said array is longer than the wavelength of the lowest frequency within the broadband frequency content of said seismic pulses and wherein the spacing between detectors is less than the wavelength of the highest frequency within the broadband frequency content of said seismic pulses.

* * * * *